US008826524B2

(12) United States Patent
Matsuoka et al.

(10) Patent No.: US 8,826,524 B2
(45) Date of Patent: Sep. 9, 2014

(54) FITTING TOOL FOR LIQUID ABSORBER AND FITTING METHOD

(75) Inventors: Hiroki Matsuoka, Azumino (JP); Atsushi Yoshida, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1108 days.

(21) Appl. No.: 12/178,189

(22) Filed: Jul. 23, 2008

(65) Prior Publication Data

US 2009/0025200 A1 Jan. 29, 2009

(30) Foreign Application Priority Data

Jul. 24, 2007 (JP) ................................ 2007-192372

(51) Int. Cl.
*B41J 2/17* (2006.01)
*B23Q 7/00* (2006.01)
*B41J 2/165* (2006.01)

(52) U.S. Cl.
CPC ...... *B41J 2/16508* (2013.01); *B41J 2002/1742* (2013.01); *B41J 2/1721* (2013.01)
USPC ................ 29/760; 29/759; 29/890.1; 347/31; 347/108

(58) Field of Classification Search
USPC ............. 29/758–760, 890.1, 830; 347/29, 31, 347/32, 108
See application file for complete search history.

(56) References Cited

U.S. PATENT DOCUMENTS 6,588,876 B2 * 7/2003 Taylor et al. ................ 347/31 X

FOREIGN PATENT DOCUMENTS

| | | | |
|---|---|---|---|
| JP | 02102058 A * | 4/1990 | ................. 347/29 X |
| JP | 05-208504 A | 8/1993 | |
| JP | 07-178928 A | 7/1995 | |
| JP | 2000-062202 | 2/2000 | |

OTHER PUBLICATIONS

Machine Language Translation of JP 2000-062202.*

* cited by examiner

*Primary Examiner* — A. Dexter Tugbang
(74) *Attorney, Agent, or Firm* — Workman Nydegger

(57) ABSTRACT

Provided is a fitting tool for a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the fitting tool including: a holding portion which holds the liquid absorber; and a locking portion which has elasticity and is locked to a portion of the cap when the holding portion is inserted into the cap.

8 Claims, 8 Drawing Sheets

FITTING TOOL FOR LIQUID ABSORBER AND FITTING METHOD

BACKGROUND

1. Technical Field

The present invention relates to a fitting tool for fitting a liquid absorber for absorbing liquid in a cap included in a liquid ejecting apparatus such as an ink jet printer and a method of fitting a liquid absorber using the fitting tool.

2. Related Art

Generally, as a liquid ejecting apparatus for ejecting ink (liquid) from a nozzle opening formed in a recording head (liquid ejecting head) to a target, for example, an ink jet printer (hereinafter, referred to as a printer) is widely known. In such a printer, generally, the recording head is cleaned for the purpose of suppressing clogging of the nozzle opening due to thickened ink and for discharging the ink, in which air bubbles or dust is mixed, from the nozzle of the recording head. In this cleaning process, thickened ink or ink, in which air bubbles are mixed, is sucked and discharged by sucking the cap in a state of contacting the cap so as to surround the nozzle opening of the recording head. In the cap, generally, an ink absorber (liquid absorber) for absorbing a portion of the ink sucked and discharged from the nozzle opening at the time of the cleaning process is received.

A printer including a cap in which an ink absorber is received is disclosed in JP-A-2000-62202. In the printer disclosed in JP-A-2000-62202, a cap member (cap) is received in a cap holder and an ink absorber is received in the cap member. Five pins which are inserted into insertion holes formed in the cap member and through-holes formed in the ink absorber are erected on the inner bottom surface of the cap holder and front ends (top ends) of the pins protrude from the upper surface of the ink absorber upward. By thermally caulking a pressing plate to the front ends of the pins, the pressing plate and the ink absorber are fixed in the cap member.

However, in the printer disclosed in JP-A-2000-62202, when the ink absorber is fitted into the cap member, since the pressing plate is thermally caulked to the front ends of the pins, the operation for fitting the ink absorber is cumbersome. In particular, if the ink absorber is thin and small, the ink absorber is susceptible to being deformed when the ink absorber is fitted into the cap member. Accordingly, the fitting operation becomes difficult or the thermal caulking device is not introduced into the cap member.

SUMMARY

An advantage of some aspects of the invention is that it provides a fitting tool for a liquid absorber, which is capable of facilitating an operation for fitting the liquid absorber into a cap, and a fitting method.

According to an aspect of the invention, there is provided a fitting tool for a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the fitting tool including: a holding portion which holds the liquid absorber; and a locking portion which has elasticity and is locked to a portion of the cap when the holding portion is inserted into the cap.

According to the invention, it is possible to lock the locking portion of the fitting tool to the portion of the cap by inserting the fitting tool into the cap in a state in which the liquid absorber is held by the holding portion of the fitting tool. Accordingly, it is possible to easily perform an operation for fitting the liquid absorber in the cap by fitting the liquid absorber in the cap via the fitting tool.

In the fitting tool, the cap may include an ejection passage forming portion which forms an ejection passage for ejecting the liquid in the cap, and the locking portion may be locked to the ejection passage forming portion when the holding portion is inserted into the cap.

According to the invention, a concave portion or a hole for locking the locking portion does not need to be separately provided in the cap by locking the locking portion of the fitting tool to the ejection passage forming portion.

In the fitting tool, the cap may include an ejection passage forming portion which forms an ejection passage for ejecting the liquid in the cap and a standby opening passage forming portion which forms a standby opening passage for standby opening the inside of the cap, and the locking portion may be locked to at least one of the ejection passage forming portion and the standby opening passage forming portion when the holding portion is inserted into the cap.

According to the invention, a concave portion or a hole for locking the locking portion does not need to be separately provided in the cap by locking the locking portion of the fitting tool to at least one of the ejection passage forming portion and the standby opening passage forming portion.

In the fitting tool, the ejection passage forming portion and the standby opening passage forming portion may be placed at the sides of the cap so as to be opposite each other, and the locking portion may include a first locking portion locked to the ejection passage forming portion and a second locking portion locked to the standby opening passage forming portion.

According to the invention, it is possible to stably fit the fitting tool in the cap by respectively fitting the first locking portion and the second locking portion of the fitting tool to the ejection passage forming portion and the standby passage forming portion of the cap.

In the fitting tool, the holding portion may include a substrate which is capable of being brought into surface contact with the liquid absorber and side plates which are formed by bending both ends of the substrate such that the liquid absorber is interposed therebetween.

Accordingly, it is possible to surely and strongly hold the ink absorber by the fitting tool. In the fitting tool, the locking portion may be formed by bending portions of the side plates outward.

According to the invention, the configuration of the locking portion is simplified.

According to another aspect of the invention, there is provided a method of fitting a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the method including: holding the liquid absorber by means of the fitting tool for fitting the liquid absorber in the cap and inserting the fitting tool, by which the liquid absorber is held, into the cap so as to be locked to a portion of the cap while a portion of the fitting tool is elastically deformed.

According to the invention, even in the case where the liquid absorber is thin and small, it is possible to easily fit the liquid absorber to the cap using the fitting tool.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an ink jet printer which is an embodiment of a liquid ejecting apparatus of the present invention will be described with reference to the accompanying drawings. In the following description, "front and back directions", "upper and lower directions" and "right and left directions" are respectively used referring to "front and back directions", "upper and lower directions" and "right and left directions" of FIG. 1 unless otherwise specified.

Figure 1:
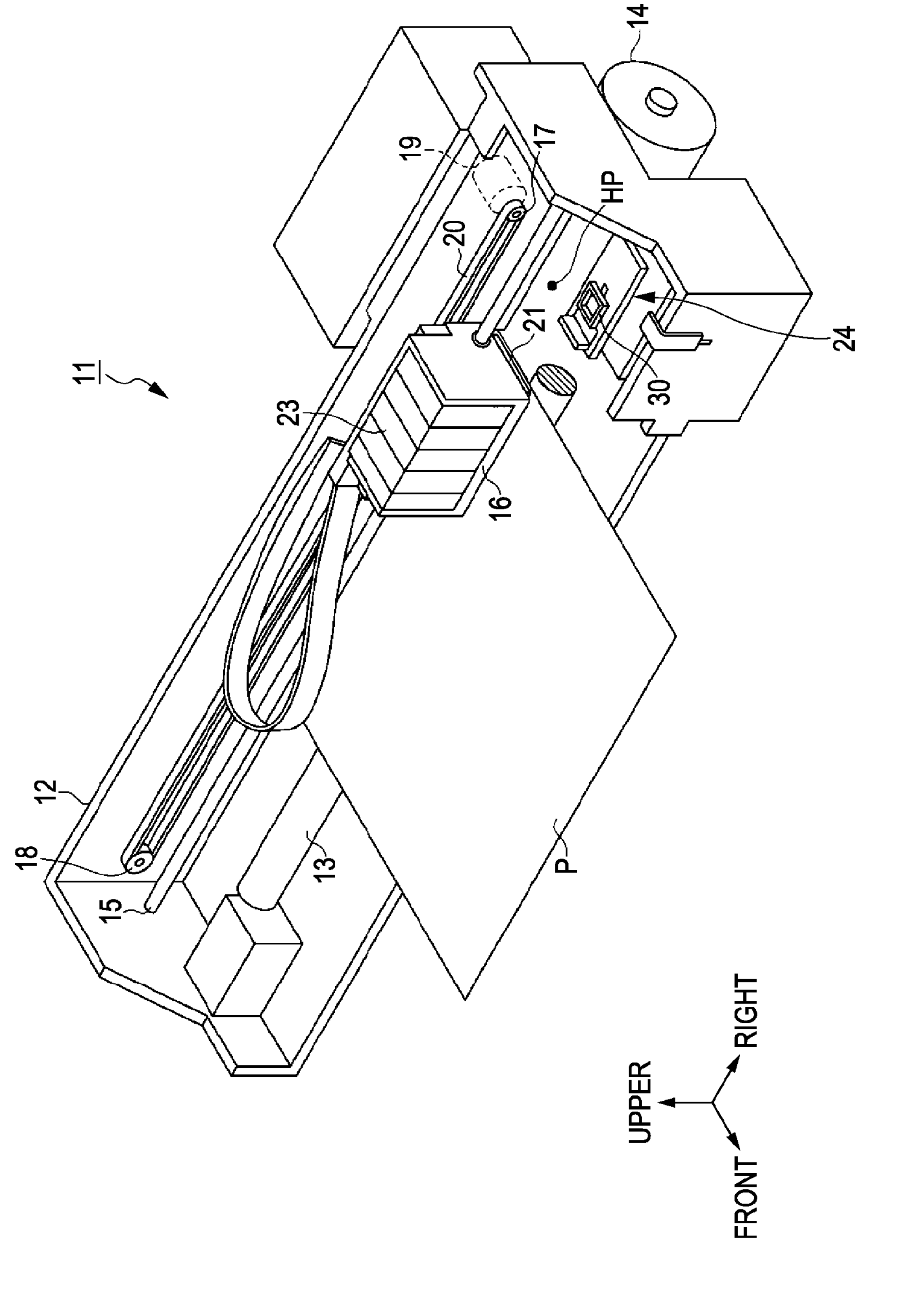
FIG. 1 is a perspective view showing an ink jet printer according to an embodiment of the invention.

As shown in FIG. 1, as the liquid ejecting apparatus, the ink jet printer 11 includes a frame 12 having a rectangular shape in plan view. In the frame 12, a platen 13 extends in the right and left directions and a recording sheet P is transported on the platen 13 from a rear side to a front side by a sheet transporting mechanism having a sheet transporting motor 14. A guide shaft 15 which extends in parallel in a longitudinal direction (right and left directions) of the platen 13 is installed above the platen 13 in the frame 12.

A carriage 16 is reciprocally supported in the axial direction (right and left directions) of the guide shaft 15. At positions corresponding to both ends of the guide shaft 15 on the back surface of the frame 12, a driving pulley 17 and a driven pulley 18 are rotatably supported. A carriage motor 19 which is a driving source for reciprocally moving the carriage 16 is connected to the driving pulley 17, and a timing belt 20 for fixing and supporting the carriage 16 is stretched over the pair of pulleys 17 and 18. Accordingly, the carriage 16 is moved in the right and left directions via the timing belt 20 while being guided by the guide shaft 15, by driving the carriage motor 19.

Figure 3:
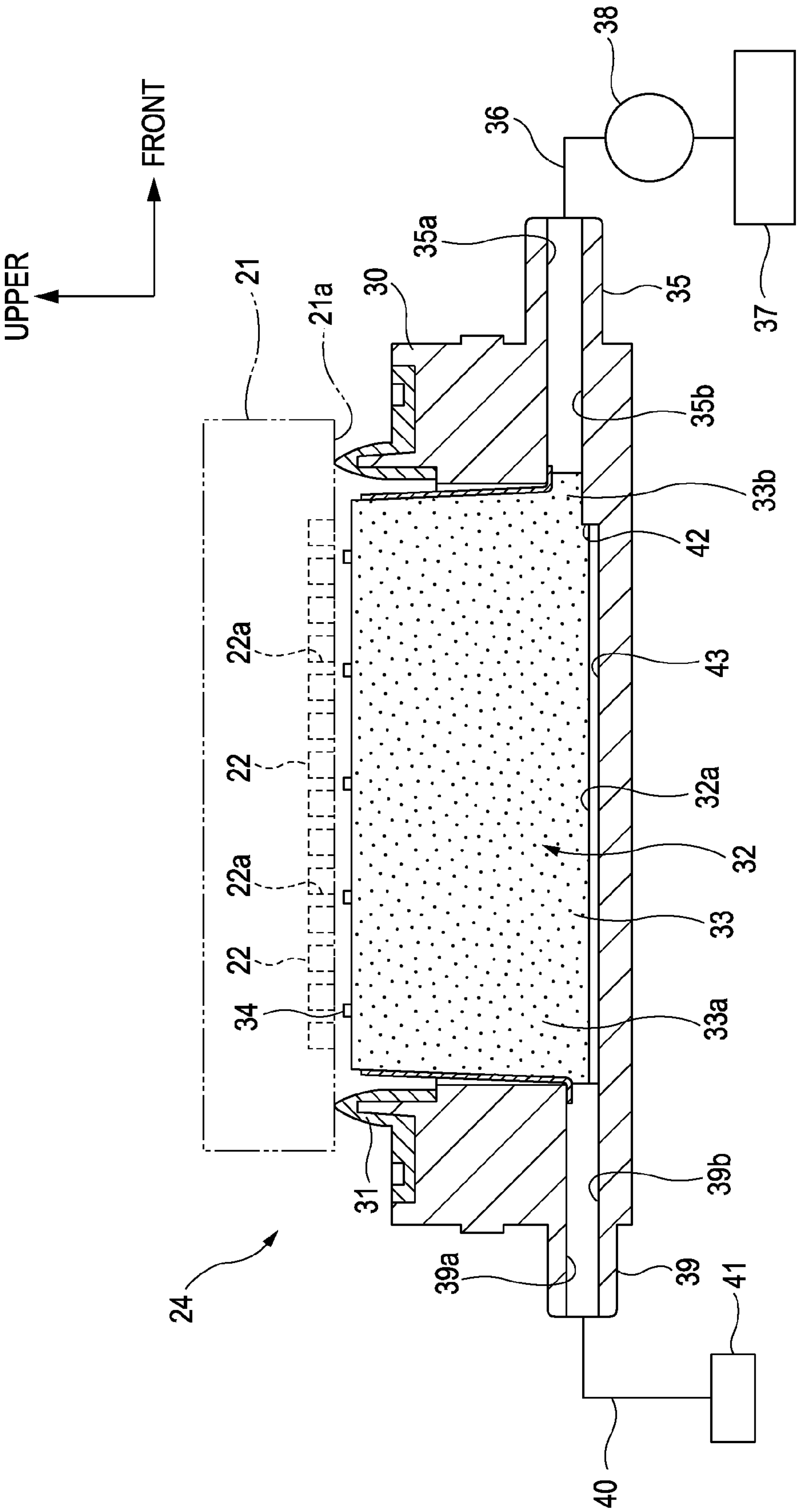
FIG. 3 is an enlarged cross-sectional view showing main portions of a maintenance unit of the printer.

On a lower surface of the carriage 16, a recording head 21 is provided as a liquid ejecting head. As shown in FIG. 3, on a nozzle forming surface 21*a* constituted by a lower surface of the recording head 21, nozzle openings 22*a* of a nozzle group including a plurality of nozzles 22 arranged in a row form a plurality (five in the present embodiment) of nozzle arrays in the front and back directions so as to be spaced by a predetermined interval in the right and left directions.

Meanwhile, as shown in FIG. 1, a plurality (five in the present embodiment) of ink cartridges 23 for supplying inks onto the recording head 21 as liquid are detachably mounted on the carriage 16. The ink cartridges 23 respectively correspond to the nozzle arrays formed on the nozzle forming surface 21*a* of the recording head 21 and the inks are supplied to the nozzle group of the nozzle arrays via ink channels (not shown) formed in the recording head 21.

A home position HP which is a maintenance position for positioning the carriage 16 when the power of the ink jet printer 11 is turned off or maintenance of the recording head 21 is performed is provided at one end (right end in FIG. 1) of the frame 12, that is, a non-print area which the recording sheet P does not reach. A maintenance unit 24 for performing various types of maintenance operations so that the ink ejection from the recording head 21 to the recording sheet P is properly maintained is provided below the home position HP.

Hereinafter, the detailed configuration of the maintenance unit 24 will be described.

Figure 2:
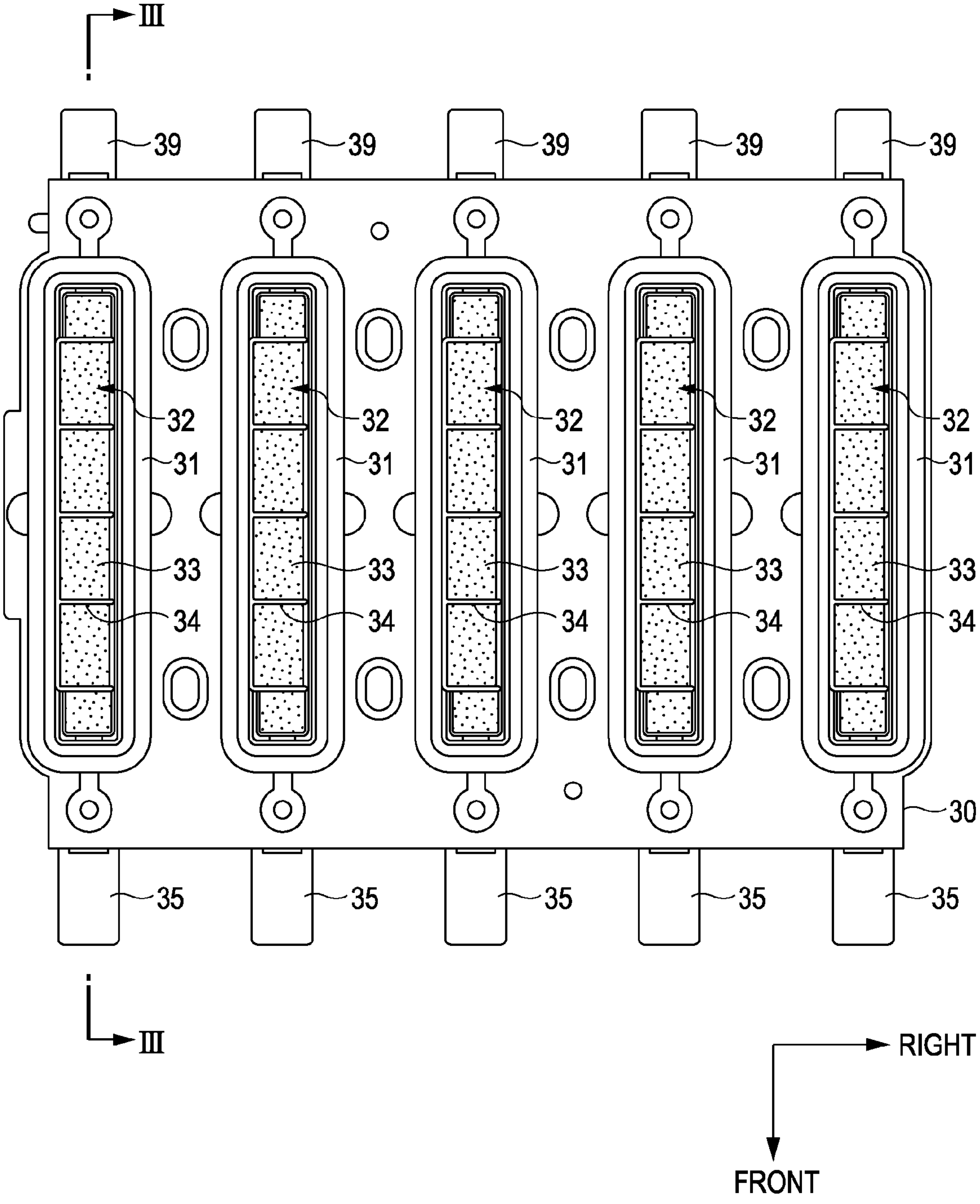
FIG. 2 is a plan view showing a cap of the printer.

As shown in FIGS. 2 and 3, the maintenance unit 24 includes a cap 30 having a substantially rectangular box shape. On an upper surface of the cap 30, a plurality (five in the present embodiment) of seal portions 31 having a rectangular annular shape and respectively corresponding to the nozzle arrays formed on the nozzle forming surface 21*a* of the recording head 21 are formed so as to constitute cap openings.

Cap cells 32 are recessed in each of the seal portions 31 on the upper surface of the cap 30 and ink absorption materials 33 are fitted in the cap cells 32 as a liquid absorber in a state of being held by fitting tools 34. The ink absorbers 33 are made of a flexible porous material and absorb and hold the inks ejected from the nozzle openings 22*a* of the nozzle arrays. In the present embodiment, a cap device is constituted by the cap 30 and the ink absorbers 33.

The maintenance unit 24 includes an elevation device (not shown) for elevating the cap 30. The cap 30 rises by means of the elevation device (not shown) in a state in which the carriage 16 is moved to the home position HP such that the upper ends of the seal portions 31 are placed close to the nozzle forming surface 21*a* of the recording head 21 and the nozzle arrays are separately covered by the cap 30.

On the lower end of the front side of the cap cells 32 of the cap 30, ejection passage forming portions 35 which form ejection passages 35*a* for ejecting the inks in the cap cells 32 to the outside of the cap 30 extend in the front and back directions. The front ends of the ejection passage forming portions 35 protrude toward the front side beyond the front surface of the cap 30. The front ends of the ejection passage forming portions 35 are connected to base end sides (upstream sides) of ejection tubes 36 made of a flexible material, and the cap cells 32 and the ejection tubes 36 communicate with each other via the ejection passages 35*a*.

The ejection tubes 36 merge together at a midway position between the base end sides (upstream sides) and front end sides (downstream sides) of the ejection tubes 36, and the front end sides (downstream sides) of the merged ejection tubes 36 are inserted into a waste ink tank 37. Near a midway position of the ejection tubes 36 at the downstream side of the merged portion of the ejection tubes 36, a suction pump 38 for sucking the inside of the ejection tubes 36 from the cap 30 to the waste ink tank 37 is provided. If the suction pump 38 is driven, the inside of the cap cells 32 are sucked via the ejection tubes 36 and the ejection passages 35*a*.

On the lower end of the back side of the cap cells 32 of the cap 30, standby opening passage forming portions 39 which form standby opening passages 39*a* for opening the insides of the cap cells 32 extend in the front and back directions. The back ends of the standby opening passage forming portions 39 protrude toward the back side beyond the back surface of the cap 30. Accordingly, in the cap 30, the ejection passage forming portions 35 and the standby opening passage forming portions 39 are arranged opposite each other in the front and back directions.

The back ends of the standby opening passage forming portions 39 are connected to the base ends of standby opening tubes 40 made of a flexible material and the cap cells 32 and the standby opening tubes 40 communicate with each other via the standby opening passages 39*a*. The standby opening tubes 40 are merged into each other at a midway position between the base ends and front end sides of the standby opening tubes 40, and a standby opening valve 41 is provided on the front end sides of the merged standby opening tubes 40. Accordingly, if the standby opening valve 41 is opened, the insides of the standby opening tubes 40 are made to be in a communicated state with the atmosphere and, if the standby opening valve 41 is closed, the insides of the standby opening tubes 40 are made to be in a non-communicated state with the atmosphere.

Figure 4A:
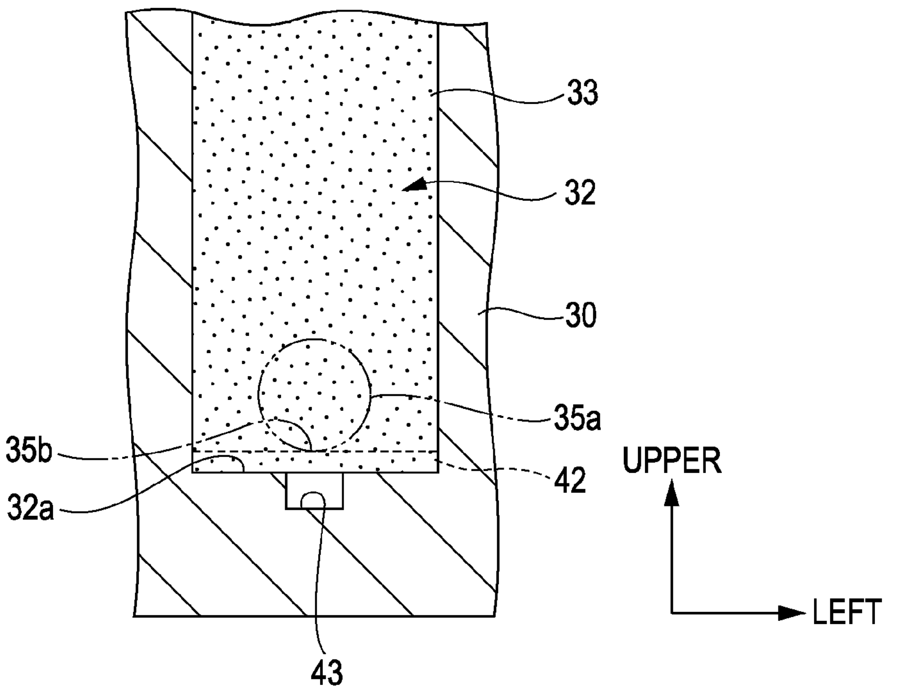
FIG. 4A is an enlarged cross-sectional view showing a positional relationship among a discharge passage, a step difference and a concave groove
Figure 4B:
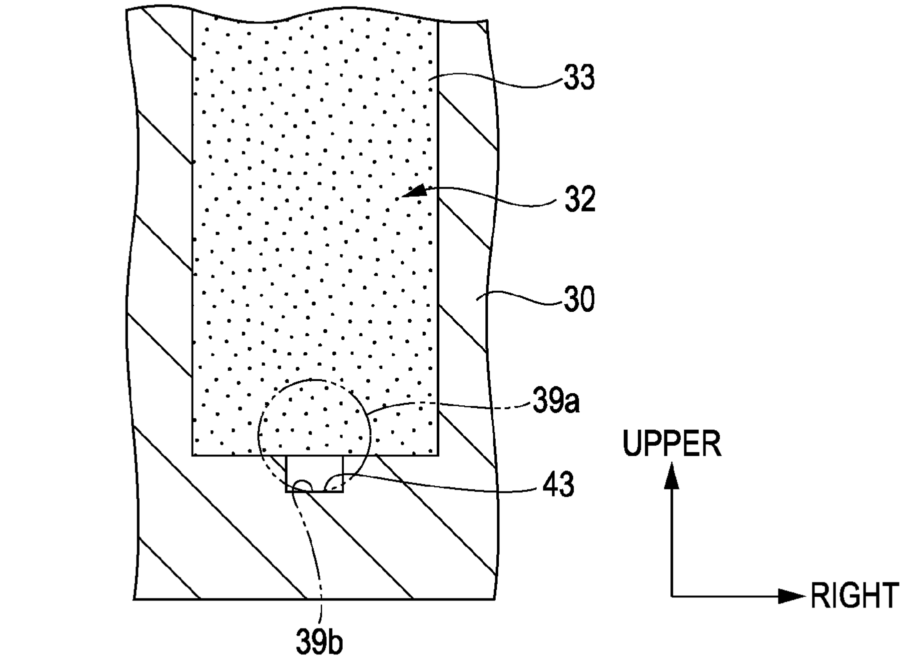
FIG. 4B is an enlarged cross-sectional view showing a positional relationship between a standby opening passage and a concave groove according to the embodiment of the invention.
Figure 5:
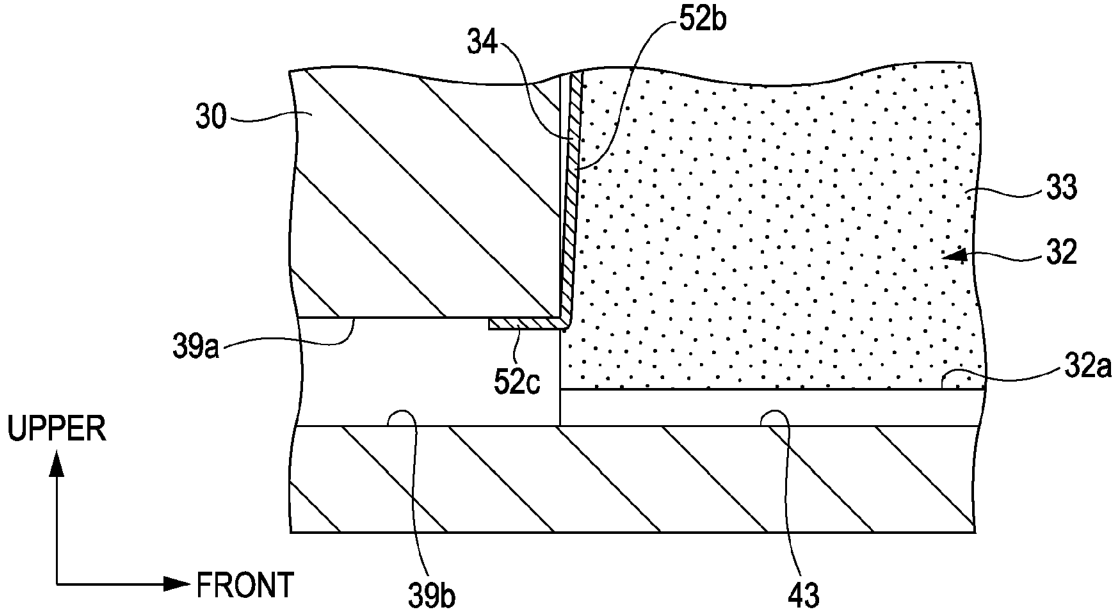
FIG. 5 is an enlarged view showing main portions of FIG. 3.
Figure 6:
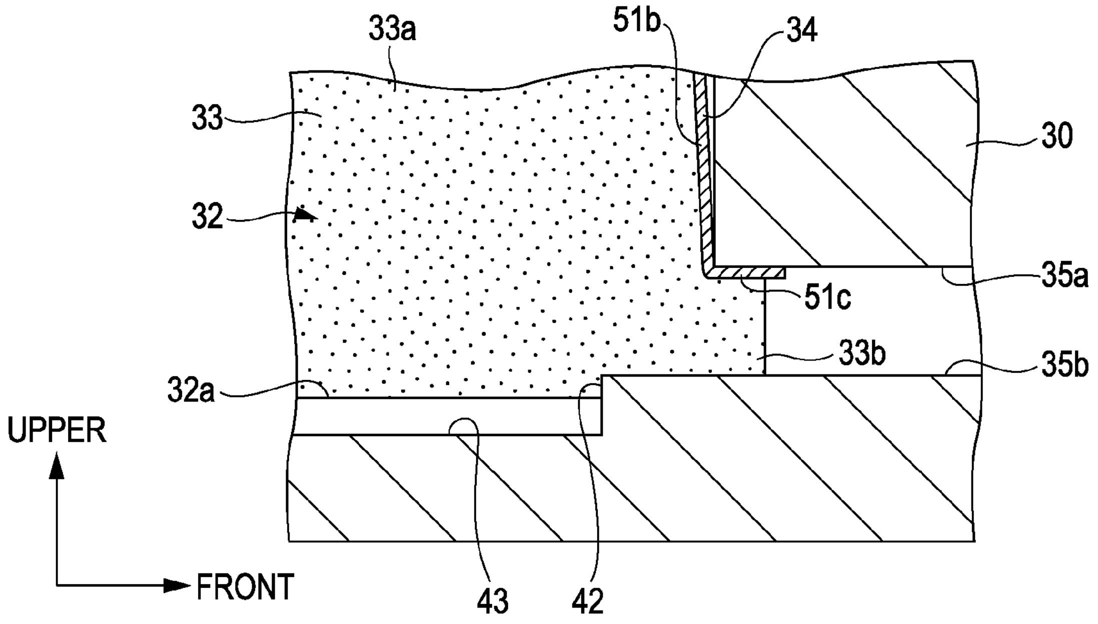
FIG. 6 is an enlarged view showing main portions of FIG. 3.

As shown in FIGS. 3, 4A and 6, a step difference 42 is provided between the bottom surfaces 32*a* of the cap cells 32 and the lower end surfaces 35*b* of the ejection passages 35*a* (the bottom surface of the ejection passage forming portions 35) such that the lower end surfaces 35*b* are higher than the bottom surfaces 32*a*. A groove 43 is provided in the bottom surfaces 32*a* of the cap cells 32 so as to extend from the standby opening passage forming portion 39 to the ejection passage forming portion 35. That is, the groove 43 is linearly connected to the standby opening passage 39*a* in a communicated state at the back end thereof and the front end thereof is adjacent to the step difference 42. As shown in FIGS. 3, 4B and 5, the bottom surface of the groove 43 and the lower end surface 39*b* of the standby opening passages 39*a* (the bottom surfaces of the standby opening passage forming portions 39) have the substantially same height.

Next, the configuration of the ink absorber 33 and each of the fitting tools 34 will be described in detail.

Figure 7:
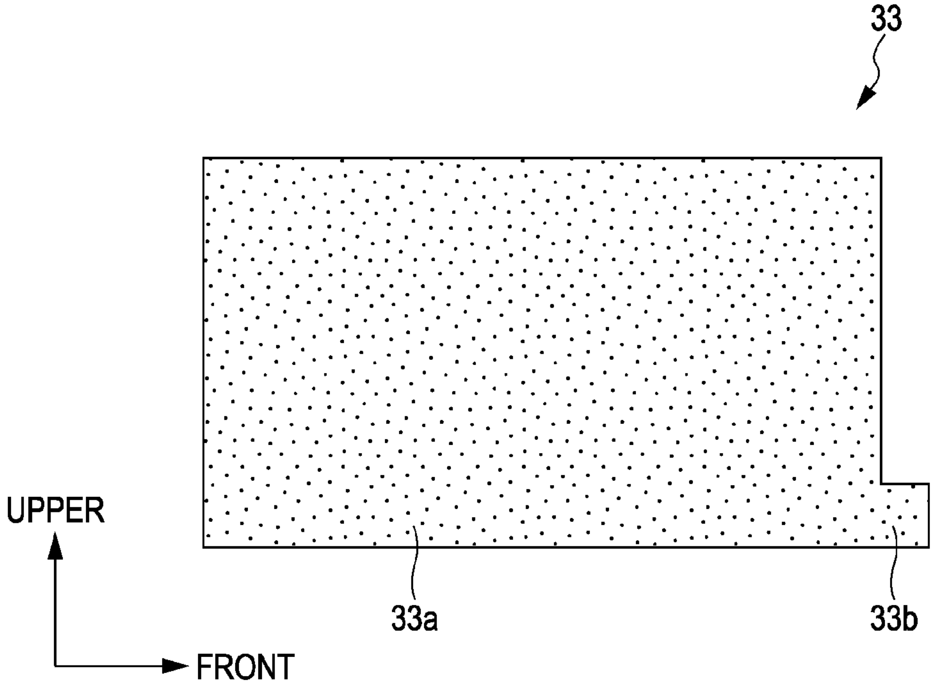
FIG. 7 is a side view showing an ink absorber according to the embodiment of the invention.

As shown in FIG. 7, the ink absorber 33 includes a main body 33*a* having a rectangular parallelepiped shape and a protrusion 33*b* having a quadrangular prism shape and protruding from the lower end to the front side on the front surface of the main body 33*a*. In the ink absorber 33, if the ink absorber 33 is fitted (received) in the cap cell 32, the main body 33*a* is placed in the cap cell 32 and the protrusion 33*b* is placed in the ejection passage 35*a* in a fitted state.

That is, the shape of the main body 33*a* corresponds to the shape of the inside of the cap cell 32 and the size of the protrusion 33*b* in the upper and lower directions and the size of the protrusion 33*b* in the right and left directions are set to be larger than the inner diameter of the ejection passage 35*a*. The lower surface of the main body 33*a* and the lower surface of the protrusion 33*b* are parallel with a horizontal surface, and the lower surface of the main body 33*a* is the same as the lower surface of the protrusion 33*b*.

Figure 8:
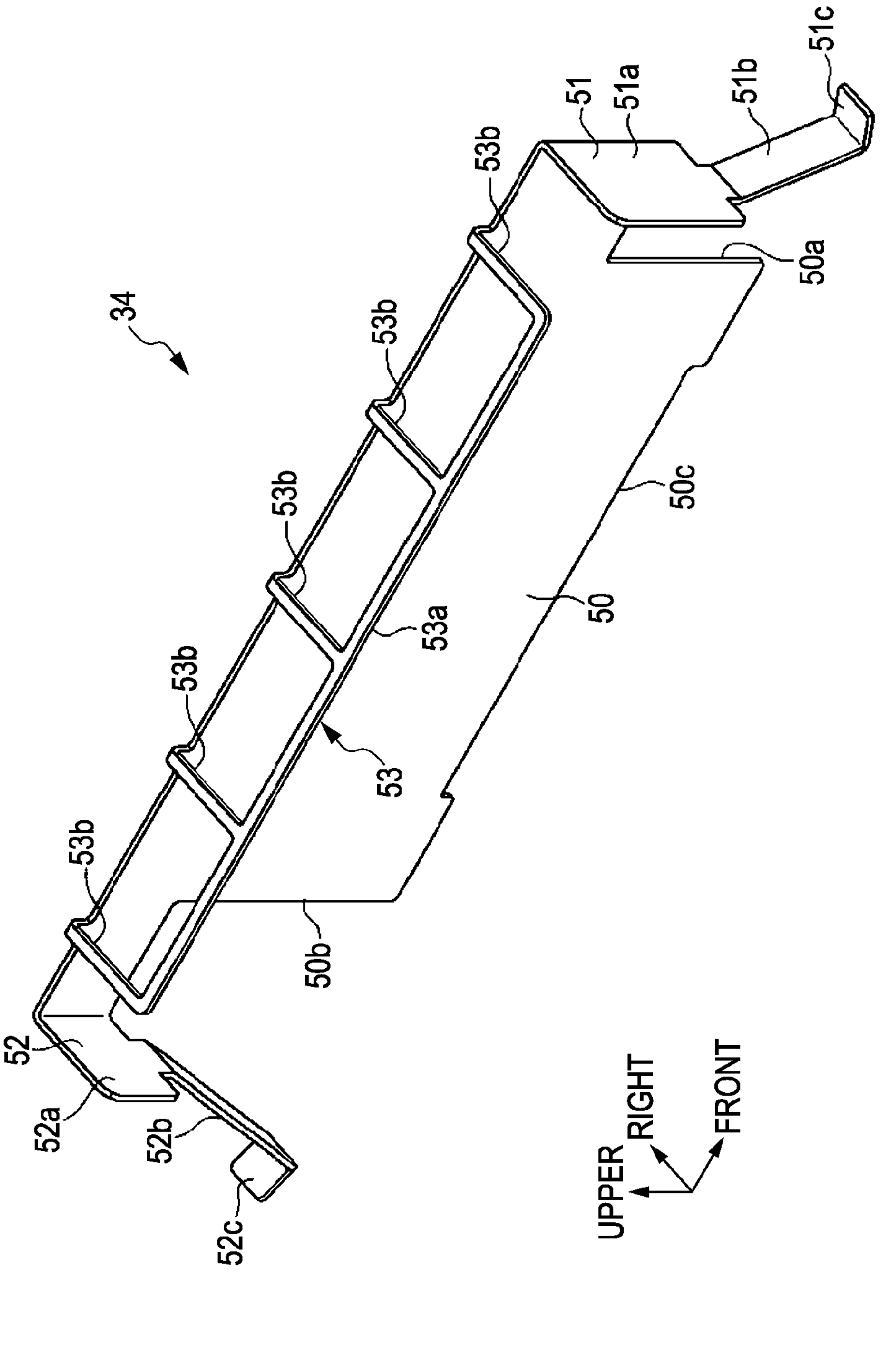
FIG. 8 is a perspective view showing a fitting tool according to the embodiment of the present invention.
Figure 9:
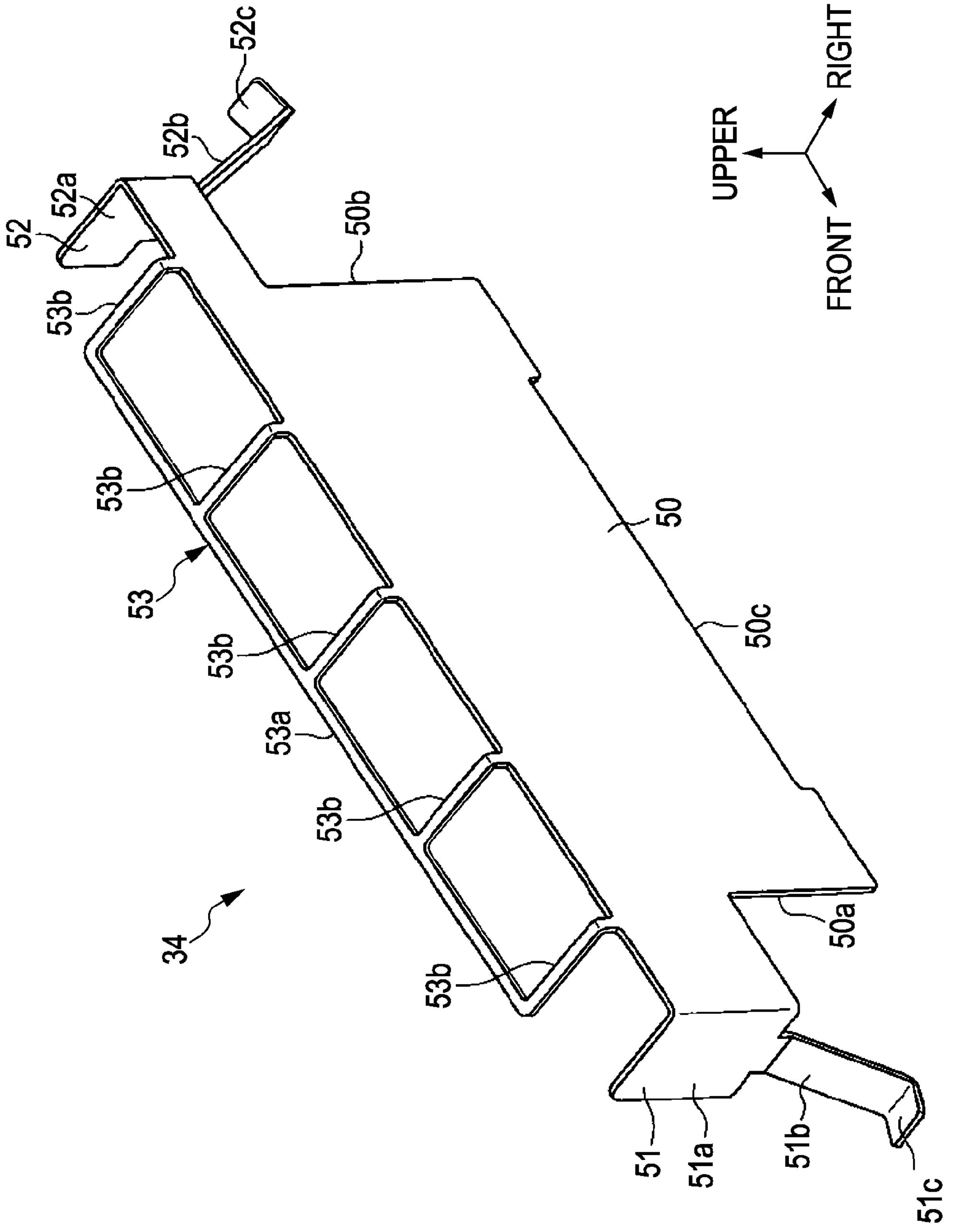
FIG. 9 is a perspective view showing a fitting tool according to the embodiment of the present invention.

As shown in FIGS. 8 and 9, each of the fitting tools 34 is made of metal which is a rust-resistant metal such as stainless steel and includes a substrate 50 which has a rectangular plate shape and is elongated in the front and back directions. In the substrate 50, a front notch 50*a* having a rectangular shape is formed in a portion from a substantially central portion in the upper and lower directions of the front end of the substrate 50 to the lower side and a back notch 50*b* having a rectangular shape is formed in a portion from the back end of the substrate 50 at a position nearer the upper end of the substrate 50 than the central portion in the upper and lower directions to the lower side of the substrate 50. A notched concave portion 50*c* is formed in the central portion of the lower side of the substrate 50 in the front and back directions.

A front plate 51 is provided on the front end of the substrate 50 as a side plate formed by perpendicularly bending a portion, other than the front notch 50*a*, of the front end of the substrate 50 leftward and a back plate 52 is provided on the back end of the substrate 50 as a side plate formed by perpendicularly bending a portion, other than the back notch 50*b*, of the back end of the substrate 50 leftward.

The front plate 51 includes a front base portion 51*a* having a rectangular plate shape and a first locking portion 51*b* having elasticity as a locking portion extending from the central portion of the lower end of the front base portion 51*a* in the right and left directions to the front oblique lower side (outside). That is, the first locking portion 51*b* is formed by bending a portion of the front plate 51 frontward (outward). The size of the first locking portion 51*b* in the right and left directions is set to be narrower than the size of the front base portion 51*a* in the right and left directions, and a first locking piece 51*c* formed by perpendicularly bending a front end of the first locking portion 51*b* upward is provided on the front end (lower side) of the first locking portion 51*b*. The size of the first locking piece 51*c* is set such that the first locking piece is capable of being inserted into the ejection passage 35*a* of the cap 30.

The back plate 52 includes a back base portion 52*a* having a rectangular plate shape and a second locking portion 52*b* having elasticity as a locking portion extending from the central portion of the lower side of the back base portion 52*a* in the right and left directions to the back oblique lower side (outside). That is, the second locking portion 52*b* is formed by bending a portion of the back plate 52 backward (outward). The size of the second locking portion 52*b* in the right and left directions is set to be narrower than the size of the back base portion 52*a* in the right and left directions, and a second locking piece 52*c* formed by perpendicularly bending a front end of the second locking portion 52*b* upward is provided on the front end (lower side) of the second locking portion 52*b*. The size of the second locking piece 52*c* is set such that the second locking piece 52*c* is capable of being inserted into the standby opening passage 39*a* of the cap 30.

The front base portion 51*a* and the back base portion 52*a* are opposite each other with the substrate 50 interposed therebetween, and the length of the front base portion 51*a* in the upper and lower directions is larger than that of the back base portion 52*a*. A pressing portion 53 having a rectangular frame shape which is elongated in the front and back directions in plan view protrudes from the upper end edge of the substrate 50 leftward. That is, the pressing portion 53 includes a vertical frame 53*a* extending in parallel with the upper end edge of the substrate 50 and five horizontal frames 53*b* for connecting the vertical frame 53*a* and the upper end edge of the substrate 50. The horizontal frames 53*b* are provided from the back end to the front end of the vertical frame 53*a* in the front and back directions at the equal intervals.

The left end edge of the pressing portion 53, the left side edge of the front base portion 51*a* and the left side edge of the back base portion 52*a* are located on the same plane. That is, the sizes of the pressing portion 53, the front base portion 51*a* and the back base portion 52*a* in the right and left directions are set to be equal to one another and correspond to the size of the cap cell 32 in the right and left directions.

In the case where the ink absorber 33 is locked to each of the fitting tools 34 such that the right surface of the ink absorber 33 (main body 33*a*) comes into contact with the left surface of the substrate 50 and the upper surface of the ink absorber 33 (main body 33*a*) comes into contact with the lower surface of the pressing portion 53, the ink absorber 33 (main body 33*a*) is inserted between the front base portion 51*a* and the back base portion 52*a*. That is, the ink absorber 33 is held by each of the fitting tools 34. In the present embodiment, the substrate 50, the front base portion 51*a* and the back base portion 52*a* constitutes a holding portion.

Next, a method of fitting the ink absorber 33 into the cap cell 32 using each of the fitting tools 34 will be described.

In the case where the ink absorber 33 is fitted into the cap cell 32, first, the ink absorber 33 is locked to each of the fitting tools 34 and the ink absorber 33 is held in each of the fitting tools 34. Subsequently, while the first locking portion 51*b* and the second locking portion 52*b* of each of the fitting tools 34 are bent inward in a state in which the ink absorber 33 is held in each of the fitting tools 34, each of the fitting tools 34 is inserted into the cap cell 32 together with the ink absorber 33. Then, the first locking portion 51*b* and the second locking portion 52*b* of each of the fitting tools 34 are held in such a manner as to be bent inward by the pressing force from the front side surface and the back side surface of the inside of the cap cell 32. At this time, the protrusion 33*b* of the ink absorber 33 is bent upward by the pressing force from the front side surface of the inside of the cap cell 32 so as to be compressed.

In this state, if each of the fitting tools 34 is thrust into the inside of the cap cell 32 together with the ink absorber 33, the lower end of the substrate 50 and the lower surface of the main body 33*a* of the ink absorber 33 are brought into contact with the bottom surface 32*a* of the inside of the cap cell 32. At this time, the first locking portion 51*b* and the second locking portion 52*b* which are bent inward are returned to their original states by their respective elastic restoration forces, the first locking piece 51*c* of the first locking portion 51*b* is locked to the ejection passage 35*a*, and the second locking piece 52*c* of the second locking portion 52*b* is locked to the standby opening passage 39*a*.

At this time, the compressed protrusion 33*b* is inserted into the ejection passage 35*a* so as to be returned to its original state by its elastic restoration force and is engaged with the ejection passage 35*a*. At this time, the lower surface of the protrusion 33*b* of the ink absorber 33 is brought into contact with the lower end surface 35*b* of the ejection passage 35*a*, but the lower end surface 35*b* of the ejection passage 35*a* is set at a higher position than the bottom surface 32*a* of the inside of the cap cell 32, with which the lower surface of the main body 33*a* of the ink absorber 33 is brought into contact, by the step difference 42.

Accordingly, the lower surface of the protrusion 33*b* of the ink absorber 33 is strongly abutted (contacted by pressure) to the lower end surface 35*b* of the ejection passage 35*a* compared with the case where the lower surface of the main body 33*a* of the ink absorber 33 is abutted to the bottom surface 32*a* of the inside of the cap cell 32. In this case, the lower surface of the protrusion 33*b* of the ink absorber 33 is pressed to the lower end surface 35*b* of the ejection passage 35*a* corresponding to the lower surface of the protrusion 33*b* so as to be deformed.

Accordingly, the first locking piece 51*c* of the first locking portion 51*b* is locked to the ejection passage 35*a* and the second locking piece 52*c* of the second locking portion 52*b* is locked to the standby opening passage 39*a* and the upward movement of the ink absorber 33 together with each of the fitting tools 34 is restricted. That is, the ink absorber 33 is fitted and fixed in the cap cell 32 via each of the fitting tools 34.

Next, the operation when the extra ink which is collected in the cap cells 32 after cleaning the recording head 21 will be described.

Generally, if the recording head 21 is cleaned, the ink sucked from the nozzle openings 22*a* is collected in the cap cells 32 of the cap 30. Thus, after cleaning, the extra ink collected in the cap cells 32 needs to be sucked and ejected.

However, when the recording head 21 is cleaned, the upper ends of the seal portions 31 of the cap 30 are closely brought into contact with the nozzle forming surface 21*a* of the recording head 21 such that the nozzle arrays are separately covered and the standby opening valve 41 is closed. In the case where the extra ink collected in the cap cells 32 of the cap 30 are sucked and ejected after the recording head 21 is cleaned, first, the standby opening valve 41 is opened and the suction pump 38 is driven. Then, the inside of the cap cell 32 is sucked from the ejection passage 35*a* and the atmosphere from the standby opening passage 39*a* is introduced into the cap cell 32.

Accordingly, the ink absorbed and held in the ink absorber 33 is guided to the ejection passage 35*a* by the protrusion 33*b* and the ink is smoothly ejected from the ejection passage 35*a*. Meanwhile, since the most of the atmosphere introduced from the standby opening passage 39*a* to the cap cell 32 flows to the ejection passage 35*a* through the groove 43, the ink collected in the groove 43 flows toward the ejection passage 35*a* by the pressure of the atmosphere. At this time, since the atmosphere flows in the groove 43, the generation of the foam of the ink is suppressed. At this time, although the foam is generated in the ink, the foam is rapidly ejected to the ejection passage 35*a* via the groove 43 together with the ink.

Since the adhesion between the lower surface of the protrusion 33*b* of the ink absorber 33 and the lower end surface 35*b* of the ejection passage 35*a* is high and the opening of the front end side of the groove 43 is closed, the atmosphere from the standby opening passage 39*a* to the groove 43 does not directly flow to the ejection passage 35*a*. Accordingly, the deterioration in suction efficiency from the ejection passage 35*a* into the cap cell 32 by the suction pump 38 is suppressed and the ink in the cap cell 32 is efficiently sucked and ejected from the ejection passage 35*a*.

In addition, in the case where a gap is formed between the lower surface of the protrusion 33*b* of the ink absorber 33 and the lower end surface 35*b* of the ejection passage 35*a*, the atmosphere introduced from the standby opening passage 39*a* into the groove 43 directly comes out from the gap to the ejection passage 35*a* and thus the suction efficiency of the ink absorbed in the ink absorber 33 deteriorates.

The above-described embodiment can obtain the following effects.

(1) Each of the fitting tools 34 is inserted into the cap cell 32 in a state in which the ink absorber 33 is held by each of the fitting tools 34 such that the first locking piece 51*c* of the first locking portion 51*b* is locked to the ejection passage 35*a* (ejection passage forming portion 35) and the second locking piece 52*c* of the second locking portion 52*b* is locked to the standby opening passage 39*a* (standby opening passage forming portion 39) in each of the fitting tools 34. Accordingly, by fitting the ink absorber 33 in the cap cell 32 via each of the fitting tools 34, the operation for fitting the ink absorber 33 into the cap cell 32 can be easily performed.

In the case where the ink absorber 33 is thin and small, the ink absorber 33 is susceptible to be deformed when the ink absorber 33 is inserted into the cap cell 32. Thus, it is difficult to perform and the operation for fitting the ink absorber 33 into the cap cell 32. In the present embodiment, even when the ink absorber 33 is thin and small, it is difficult to deform the ink absorber 33 when the ink absorber 33 into the cap cell 32 by inserting the ink absorber into the cap cell 32 in a state in which the ink absorber 33 is held in each of the fitting tools 34. Accordingly, in particular, even when the ink absorber 33 is thin and small, it is possible to easily perform the operation for fitting the ink absorber 33 into the cap cell 32.

(2) The first locking piece 51*c* of the first locking portion 51*b* and the second locking piece 52*c* of the second locking portion 52*b* of each of the fitting tools 34 are engaged with the ejection passage 35*a* (ejection passage forming portion 35) and the standby opening passage 39*a* (standby opening passage forming portion 39) of the cap 30. Accordingly, an concave portion or hole for locking the first locking piece 51*c* and the second locking piece 52*c* of each of the fitting tools 34 does not need to be separately provided in the cap 30.

(3) The first locking piece 51*c* of the first locking portion 51*b* and the second locking piece 52*c* of the second locking portion 52*b* of each of the fitting tools 34 are locked to the ejection passage 35*a* (ejection passage forming portion 35) and the standby opening passage 39*a* (standby opening passage forming portion 39) which are opposite each other the cap cell 32 interposed therebetween in the cap 30. Accordingly, it is possible to stably fit each of the fitting tools 34, in which the ink absorber 33 is held, in the cap cell 32 without performing a troublesome thermal caulking process of JP-A-2000-62202.

(4) The holding portion for holding the ink absorber 33 in each of the fitting tools 34 includes the substrate 50 which is capable of being brought into contact with the ink absorber 33 and the front base portion 51*a* and the back base portion 52*a* which are formed on the front and back ends of the substrate 50 to be bent such that the ink absorber 33 is interposed therebetween. Accordingly, it is possible to surely and strongly hold the ink absorber 33 by each of the fitting tools 34.

(5) Since the first locking portion 51*b* and the second locking portion 52*b* of each of the fitting tools 34 are formed by bending portions of the front plate 51 and the back plate 52 outward, it is possible to simplify the configurations of the first locking portion 51*b* and the second locking portion 52*b*. That is, it is possible to easily form the first locking portion 51*b* and the second locking portion 52*b*.

(6) Since each of the fitting tools 34 includes the pressing portion 53, it is possible to efficiently suppress the floating of the ink absorber 33 in the cap cell 32 in the case where the ink absorber 33 is fitted in the cap cell 32 via each of the fitting tools 34.

(7) In the case where the ink absorber 33 is received in the cap cell 32, the ink absorber 33 include the main body 33*a* placed in the cap cell 32 and the protrusion 33*b* placed in the ejection passage 35*a*. Accordingly, since the inside of the cap cell 32 is sucked from the ejection passage 35*a* by the suction pump 38 such that the extra ink absorbed and held in the main body 33*a* is guided into the ejection passage 35*a* by the protrusion 33*b*, it is possible to easily suck and eject the extra ink absorbed and held in the main portion 33*a* (ink absorber 33). That is, it is possible to smoothly suck and eject the extra ink in the cap cell 32 to the outside of the cap cell 32 through the ejection passage 35*a* by the suction pump 38.

(8) Since the protrusion 33*b* of the ink absorber 33 is placed in the ejection passage 35*a* in the engaged state, it is possible to reduce suction loss by the suction pump 38 in the case where the inside of the ejection passage 35*a* is sucked to the outside of the cap 30 by the suction pump 38. Accordingly, it is possible to efficiently suck and eject the extra ink absorbed and held in the main body 33*a* (ink absorber 33) via the ejection passage 35*a* by the suction pump 38.

(9) Since the protrusion 33*b* of the ink absorber 33 has flexibility and is inserted into the ejection passage 35*a* in the compressed state, it is possible to closely bring the outer surface of the protrusion 33*b* into contact with the inner circumferential surface of the ejection passage 35*a*.

(10) The groove 43 extending from the standby opening passage 39*a* to the ejection passage 35*a* is formed in the bottom surface 32*a* of the inside of the cap cell 32. Accordingly, the inside of the cap cell 32 is sucked from the ejection passage 35*a* such that the extra ink collected in the bottom surface 32*a* of the inside of the cap cell 32 is suitably guided from the standby opening passage 39*a* to the ejection passage 35*a* by the groove 43. In this case, since the atmosphere flows from the standby opening passage 39*a* to the ejection passage 35*a* in the groove 43, it is possible to suppress the generation of the foam of the ink. In addition, although the foam is generated in the ink, it is possible to rapidly guide the ink, in which the foam is generated, from the standby opening passage 39*a* to the ejection passage 35*a* by the groove 43.

(11) Since the standby opening passage 39*a* is linearly connected to the back end of the groove 43 in the communicated state, it is possible to easily introduce the atmosphere from the standby opening passage 39*a* into the groove 43 (cap cell 32). That is, since it is possible to reduce resistance when the atmosphere from the standby opening passage 39*a* is introduced into the groove 43, it is possible to smoothly introduce the atmosphere from the standby opening passage 39*a* into the groove 43.

(12) The step difference 42 is provided between the lower end surface 35*b* of the ejection passage 35*a* and the bottom surface 32*a* of the inside of the cap cell 32 such that the lower end surface 35*b* is higher than the bottom surface 32*a*. Accordingly, since the protrusion 33*b* of the ink absorber 33 contacts the lower end surface 35*b* of the ejection passage 35*a* by pressure when the ink absorber 33 is received in the cap cell 32, it is possible to increase the adhesion between the protrusion 33*b* of the ink absorber 33 and the lower end surface 35*b* of the ejection passage 35*a*.

(13) Since the step difference 42 is abutted to the front end of the groove 43, the front end of the groove 43 is closed by the step difference 42. Accordingly, the atmosphere introduced from the standby opening passage 39*a* to the groove 43 is not directly introduced into the ejection passage 35*a*.

MODIFIED EXAMPLE

The above-described embodiment may be modified as follows.

In each of the fitting tools 34, any one of the first locking portion 51*b* and the second locking portion 52*b* may be omitted.

The first locking portion 51*b* and the second locking portion 52*b* of each of the fitting tools 34 do not need to be respectively locked to the ejection passage 35*a* and the standby opening passage 39*a* and a concave portion or a hole for locking the first locking portion 51*b* and the second locking portion 52*b* may be separately provided in the cap 30.

The front end of the groove 43 does not need to be necessarily abutted to the step difference 42. That is, the front end of the groove 43 and the step difference 42 may be separated from each other.

The step difference 42 may be omitted.

In the cap 30, the ejection passage forming portion 35 and the standby opening passage forming portion 39 may be provided at the lower side of the cap cell 32 downward. In this case, the first locking portion 51*b* and the second locking portion 52*b* of each of the fitting tools 34 are locked to the end (lower end) opposite to the cap cell 32 in the ejection passage forming portion 35 and the standby opening passage forming portion 39.

In the cap 30, the groove 43 and the standby opening passage 39*a* do not need to be linearly connected to each other. That is, the standby opening passage 39*a* may be connected to the groove so as to cross the groove 43.

In the bottom surface 32*a* of the inside of the cap cell 32, the groove 43 may extend from a portion other than the standby opening passage forming portion 39 to the ejection passage forming portion 35.

In the cap 30, the groove 43 may be omitted.

In the cap 30, the standby opening passage forming portion 39 (standby opening passage 39*a*) may be omitted. In this case, in each of the fitting tools 34, only the first locking portion 51*b* is locked to the ejection passage 35*a*.

The protrusion 33*b* of the ink absorber 33 may be placed in the ejection passage 35*a* in a loose-fitted state.

Although, in the above-described embodiment, the ink jet printer 11 is implemented as the liquid ejecting apparatus, a liquid ejecting apparatus for ejecting liquid other than the ink (including liquid obtained by dispersing or mixing particles of a functional material in liquid or fluid such as gel) may be embodied. In the present specification, the liquid includes liquid and fluid in addition to an inorganic solvent, an organic solvent, a solution, liquid resin, liquid metal (metallic melt).

The entire disclosure of Japanese Patent Application No. 2007-192372, filed Jul. 24, 2007 is expressly incorporated by reference herein.

What is claimed is:

1. A fitting tool for a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the fitting tool comprising:

a holding portion which holds the liquid absorber; and a locking portion which has elasticity and is locked to a portion of the cap at a time when the holding portion, which is holding the liquid absorber, and the liquid absorber are inserted into the cap, wherein the holding portion includes a substrate which is capable of being brought into surface contact with the liquid absorber and a side plate which is formed by bending an end of the substrate.

2. The fitting tool according to claim 1, wherein:

the cap includes an ejection passage forming portion, which forms an ejection passage for ejecting the liquid in the cap, and the locking portion is locked to the ejection passage forming portion when the holding portion is inserted into the cap.

3. The fitting tool according to claim 1, wherein:

the cap includes an ejection passage forming portion, which forms an ejection passage for ejecting the liquid in the cap and a standby opening passage forming portion which forms a standby opening passage for standby opening the inside of the cap, and the locking portion is locked to at least one of the ejection passage forming portion and the standby opening passage forming portion when the holding portion is inserted into the cap.

4. The fitting tool according to claim 3, wherein:

the ejection passage forming portion and the standby opening passage forming portion are placed at the sides of the cap so as to be opposite each other, and the locking portion includes a first locking portion locked to the ejection passage forming portion and a second locking portion locked to the standby opening passage forming portion.

5. The fitting tool according to claim 1, wherein the holding portion includes more than one side plates which are formed by bending both ends of the substrate such that the liquid absorber is interposed therebetween.

6. The fitting tool according to claim 5, wherein the locking portion is formed by bending portions of the side plates outward.

7. A fitting tool for a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the fitting tool comprising:

a holding portion which holds the liquid absorber; and a locking portion which has elasticity and is locked to a portion of the cap when the holding portion is inserted into the cap, wherein the cap includes an ejection passage forming portion which forms an ejection passage for ejecting the liquid in the cap and a standby opening passage forming portion which forms a standby opening passage for standby opening the inside of the cap, and the locking portion is locked to at least one of the ejection passage forming portion and the standby opening passage forming portion when the holding portion is inserted into the cap, wherein the ejection passage forming portion and the standby opening passage forming portion are placed at the sides of the cap so as to be opposite each other, and the locking portion includes a first locking portion locked to the ejection passage forming portion and a second locking portion locked to the standby opening passage forming portion.

8. A fitting tool for a liquid absorber which is included in a liquid ejecting apparatus having a liquid ejecting head for ejecting liquid from nozzle openings formed in a nozzle forming surface and fits the liquid absorber for absorbing the liquid in a cap which is capable of being abutted to the liquid ejecting head so as to cover the nozzle openings, the fitting tool comprising:

a holding portion which holds the liquid absorber; and a locking portion which has elasticity and is locked to a portion of the cap when the holding portion is inserted into the cap, wherein the holding portion includes a substrate which is capable of being brought into surface contact with the liquid absorber and side plates which are formed by bending both ends of the substrate such that the liquid absorber is interposed therebetween.

* * * * *